(12) United States Patent
Al Sayeed

(10) Patent No.: US 12,489,525 B2
(45) Date of Patent: *Dec. 2, 2025

(54) AUTO-SQUELCHING OPTICAL TRAFFIC CHANNELS IN AN ASE-LOADED SYSTEM

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,181

(22) Filed: Apr. 23, 2024

(65) Prior Publication Data

US 2024/0275478 A1    Aug. 15, 2024

Related U.S. Application Data

(63) Continuation of application No. 17/901,786, filed on Sep. 1, 2022, now Pat. No. 11,990,933.

(51) Int. Cl.
*H04B 10/03* (2013.01)
*H04B 10/079* (2013.01)

(52) U.S. Cl.
CPC ....... *H04B 10/03* (2013.01); *H04B 10/07953* (2013.01); *H04B 10/0797* (2013.01)

(58) Field of Classification Search
CPC .......... H04B 10/07953; H04B 10/0797; H04B 10/03
USPC ........................................................... 398/1
See application file for complete search history.

(56) References Cited

U.S. PATENT DOCUMENTS

| | | | |
|---|---|---|---|
| 6,535,330 B1 | 3/2003 | Lelic et al. | |
| 8,509,621 B2 | 8/2013 | Boertjes | |
| 8,971,705 B2 * | 3/2015 | Boertjes | H04J 14/02212 398/38 |
| 9,252,913 B2 | 2/2016 | Al Sayeed et al. | |

(Continued)

FOREIGN PATENT DOCUMENTS

| | | |
|---|---|---|
| EP | 3 738 225 B1 | 3/2021 |
| EP | 3 913 824 A1 | 11/2021 |

(Continued)

OTHER PUBLICATIONS

Elson et al; High spectral density transmission emulation using amplified spontaneous emission noise; Jan. 2016; Optics Letters, vol. 41, No. 1; pp. 1-4. (Year: 2016).*

(Continued)

*Primary Examiner* — Amritbir K Sandhu
(74) *Attorney, Agent, or Firm* — Baratta Law PLLC; Lawrence A. Baratta, Jr.

(57) ABSTRACT

A method, implemented in an optical line system, includes monitoring traffic channels of a plurality of traffic channels; determining one or more traffic channels of the plurality of traffic channels are problematic with respect to other traffic channels of the plurality of traffic channels; and squelching the one or more traffic channels and replacing the squelched one or more traffic channels with channel holders. The method can further include continuing the monitoring of the squelched one or more traffic channels; determining the squelched one or more traffic channels are no longer problematic; and re-adding the squelched one or more traffic channels by replacing the channel holders therewith.

20 Claims, 7 Drawing Sheets

(56) References Cited

U.S. PATENT DOCUMENTS

| | | |
|---|---|---|
| 9,344,191 B2 | 5/2016 | Al Sayeed et al. |
| 9,577,763 B2 | 2/2017 | Al Sayeed et al. |
| 9,768,902 B2 | 9/2017 | Al Sayeed et al. |
| 9,806,803 B2 | 10/2017 | Bownass et al. |
| 9,882,634 B1 | 1/2018 | Al Sayeed et al. |
| 9,906,294 B2 | 2/2018 | Al Sayeed et al. |
| 9,918,146 B2 | 3/2018 | Swinkels et al. |
| 9,973,295 B2 | 5/2018 | Al Sayeed et al. |
| 9,985,726 B1 | 5/2018 | Al Sayeed et al. |
| 9,986,317 B1 | 5/2018 | Al Sayeed et al. |
| 10,063,313 B1 | 8/2018 | Al Sayeed et al. |
| 10,237,011 B2 | 3/2019 | Al Sayeed et al. |
| 10,361,957 B1 * | 7/2019 | MacKay ............ H04B 10/0779 |
| 10,439,709 B1 * | 10/2019 | Al Sayeed ......... H04J 14/0212 |
| 10,536,235 B2 | 1/2020 | Al Sayeed et al. |
| 10,547,404 B1 | 1/2020 | Al Sayeed et al. |
| 10,587,339 B1 | 3/2020 | Al Sayeed et al. |
| 10,686,543 B1 | 6/2020 | Al Sayeed et al. |
| 10,833,791 B1 * | 11/2020 | Al Sayeed ......... H04J 14/0206 |
| 10,868,614 B2 | 12/2020 | Al Sayeed et al. |
| 10,897,321 B1 | 1/2021 | Al Sayeed et al. |
| 10,965,373 B1 | 3/2021 | Al Sayeed et al. |
| 10,985,838 B1 | 4/2021 | Al Sayeed et al. |
| 10,992,374 B1 | 4/2021 | Miedema et al. |
| 11,057,146 B2 | 7/2021 | Al Sayeed et al. |
| 11,057,690 B2 | 7/2021 | Al Sayeed et al. |
| 11,223,423 B1 | 1/2022 | Al Sayeed et al. |
| 11,990,933 B2 * | 5/2024 | Al Sayeed ............ H04B 10/03 |
| 12,126,375 B2 * | 10/2024 | Piciaccia ............ H04B 10/0795 |
| 2017/0279526 A1 | 9/2017 | Bownass et al. |
| 2018/0269964 A1 * | 9/2018 | Mertz ................ G02B 6/02061 |
| 2019/0173602 A1 | 6/2019 | Al Sayeed et al. |
| 2019/0356407 A1 | 11/2019 | Al Sayeed et al. |
| 2020/0076499 A1 | 3/2020 | Al Sayeed et al. |
| 2020/0304204 A1 * | 9/2020 | Syed ................ H04B 10/0793 |
| 2020/0336238 A1 * | 10/2020 | St-Laurent ............. G02F 1/313 |
| 2022/0069903 A1 | 3/2022 | Chen et al. |
| 2022/0166500 A1 | 5/2022 | Bownass et al. |
| 2022/0255282 A1 | 8/2022 | Al Sayeed et al. |
| 2022/0329318 A1 | 10/2022 | Mehta et al. |
| 2023/0412267 A1 | 12/2023 | Piciaccia et al. |

FOREIGN PATENT DOCUMENTS

| | | |
|---|---|---|
| EP | 3 804 184 B1 | 6/2022 |
| WO | 2020150010 A1 | 7/2020 |
| WO | 2021162753 A1 | 8/2021 |
| WO | 2022072579 A1 | 4/2022 |

OTHER PUBLICATIONS

Huazhi Lun et al., "Soft Failure Identification for Long-haul Optical Communication Systems Based on One-dimensional Convolutional Neural Network," Journal of Lightwave Technology, vol. 38, No. 11, Jun. 1, 2020, pp. 2992-2999.

* cited by examiner

*170*

IN RESPONSE TO ANALYZING OPTICAL SIGNALS PROPAGATING IN AN OPTICAL LINE SYSTEM, DETERMINE WHETHER ONE OR MORE CHANNELS OF A SPECTRUM OF THE OPTICAL SIGNALS ARE PROBLEMATIC, WHEREBY THE ONE OR MORE PROBLEMATIC CHANNELS ARE DETERMINED TO BE PROBLEMATIC BASED ON THE SEVERITY OF A NEGATIVE IMPACT THAT THE ONE OR MORE PROBLEMATIC CHANNELS HAVE ON SPECTRUM HEALTH   *172*

AUTO-SQUELCHING THE ONE OR MORE PROBLEMATIC CHANNELS BY REPLACING THE ONE OR MORE PROBLEMATIC CHANNELS WITH ONE OR MORE AMPLIFIED SPONTANEOUS EMISSION (ASE) CHANNEL HOLDERS   *174*

FIG. 6

AUTO-SQUELCHING OPTICAL TRAFFIC CHANNELS IN AN ASE-LOADED SYSTEM

CROSS-REFERENCE

The present disclosure is a continuation of U.S. patent application Ser. No. 17/901,786, filed Sep. 1, 2022, the contents of which are incorporated by reference in their entirety.

TECHNICAL FIELD

The present disclosure generally relates to optical networking systems and methods. More particularly, the present disclosure relates to automatically squelching problematic traffic channels and replacing them with Amplified Spontaneous Emission (ASE) or dummy channel holders.

BACKGROUND

Generally, optical line systems are designed to carry optical signals through a network. In many systems, the optical signals may be carried within a predetermined range of wavelengths or within a spectrum that includes multiple channels. When one or more channels of the entire spectrum are dropped, intentionally or unintentionally, the missing channels can be replaced with Amplified Spontaneous Emission (ASE) channels or dummy channel holders that do not necessarily include any useful data. The purpose of filling in the missing channels with ASE is to maintain a continuous power level, which can help to avoid issues that can arise with neighboring channels in the spectrum. Thus, an ASE-loaded optical line system is designed to operate at a filled spectrum condition. When channels are dropped in these systems, due to some upstream fault (e.g., fiber disconnect, optical line failure, component failure, etc.), the dropped channel power are typically replaced with ASE at the first section-multiplexer downstream from the fault.

One objective for replacing the dropped channels with ASE at the first multiplexer may be, firstly, to keep the total power at a constant level at the point where the spectrum is launched onto the optical fiber, in order to reduce the impact of possible Stimulated Raman Scattering (SRS) affects. Secondly, replacing with ASE also reduces or eliminates the impact of other linear transmission affects (e.g., tilt, ripple, spectral hole burning, etc.) on the downstream surviving channels.

At the same time, many ASE-loaded systems may be designed to operate at or near an amplifier saturation region (i.e., at maximum total output power) in order to keep noise figures low and, hence, to maximize incremental Optical Signal-to-Noise Ratio (OSNR). However, when operating at or near the saturation level, one problem that may come up is when one or more channels (or subset) of the spectrum start overshooting their target launch power leading to the fiber. For example, an overshoot can take place if there is a power surge coming from upstream, such as from a foreign line terminal or from a foreign modem in a disaggregated system.

With a power overshoot of one or more channels and the amplifier being at or near saturation, the total power going to the fiber does not change, but it may lead to spectrum tilt, which is a condition in which the lower-wavelength channels will tend to be higher in power while higher-wavelength channels will tend to be lower in power. In some cases where there is more extreme spectrum tilt, the power response of the amplifier can be almost a "dB-to-dB" correlation in which, for each dB of power saturation, the spectrum experiences one dB of tilt.

Some modern amplifier control loops may have the ability to reduce their Designed Flat Gain (DFG) when the power saturation happens in order to maintain a flat spectrum. This may be effective down to a certain limit (i.e., minimum gain), but, beyond that, the spectrum tilt essentially becomes inevitable. The impact of spectrum tilt in a C+L optical system can be more severe, since the spectrum tilt in one band (e.g., the C-band) can impact traffic on the other band (e.g., L-band).

Another issue with saturated and tilted spectrum is that these conditions can prevent new traffic from being added into the optical line system, hence failing layer 0 restoration attempts, since the newly added channels can appear either under-launching or over-launching to the fiber. Either way, the system may fail to keep continuity in the traffic. Another issue to consider in optical line systems is the condition of a fluctuating power source, which can also cause problems in the optical line system that should be dealt with.

To deal with sudden power surges from foreign modems or foreign line terminals, one option is to put a power controller of the first section-mux channel in a power mode. For example, the power controller may include Proportional, Integral, and Derivative (PID) types of control. A fast power mode (e.g., running with an integral coefficient Ki equal to 1) will normally bring down any overshoot channel on its next cycle. However, the problem is that dealing with any incoming overshoot may depend on the dynamic range of the power controller. If there are multiple inter-workings with foreign degree or connections, such that each homogenously connected Network Element (NE) creates an island in between two foreign connections, then a fast power controller might not be able to run in each inter-working mux location to avoid ringing between a plurality of cascaded power controllers. Power controllers with aggressive coefficients cannot deal with fluctuating power sources other than causing more instability along the network.

Also, it is possible to run in a dampen power mode in each inter-working mux location by significantly damping the coefficients to deal with overshoots. However, depending on the PID coefficients, a dampen power controller may take tens of minutes to settle down over a plurality of cascaded controllers. Regardless of how much the PID coefficients are made dampen, it can only provide a scalable solution up to a limited number of foreign inter-working seams. The same goes with fluctuating source power as a dampen controller may take significantly longer time to react and to trace any power fluctuations. Therefore, there is a need to in the field of optical or photonic system to replace traffic channels with ASE-loaded channels based on certain criteria to overcome the issues of the conventional systems.

BRIEF SUMMARY

The present disclosure is related to systems and methods for detecting when problematic channels of an optical spectrum reach a point where they can have a negative impact on spectrum health. When these limits are reached, which may include the detection of power levels being outside acceptable limits in addition to the out-of-range power levels extending over a predetermined time period, the problematic channels are replaced with Amplified Spontaneous Emission (ASE) channel holders to maintain the spectral power level within a range that will not impact the spectrum health negatively.

According to one implementation of the present disclosure, a process for monitoring channels of an optical spectrum in an optical line system may be executed. For example, in response to analyzing optical signals propagating in an optical line system, the process may include the step of determining whether one or more channels of a spectrum of the optical signals are problematic. The one or more problematic channels may be determined as being problematic based on the severity of a negative impact that the one or more problematic channels have on spectrum health. Furthermore, the process may include the step of auto-squelching the one or more problematic channels by replacing the one or more problematic channels with one or more Amplified Spontaneous Emission (ASE) channel holders.

In some additional embodiments, the one or more problematic channels may be determined to be problematic based on a) overshoot characteristics measured over a first predetermined length of time with respect to a first target level, and/or b) fluctuation characteristics measured over a second predetermined length of time with respect to second and third target levels. In addition, the one or more problematic channels may be determined to be problematic based on a) a Power Spectrum Density (PSD) of the respective channel exceeding the first target level over the first predetermined length of time, and/or b) a PSD of the respective channel falling outside a range of target PSD levels between the second and third target levels.

According to some embodiments, the one or more problematic channels may be determined to be problematic based on an impact on the link budget or performance of the spectrum health being greater than a predetermined threshold. Also, the one or more problematic channels may be determined to be problematic based on a) an amount of a Power Spectral Density (PSD) overshoot with respect to a predetermined launch power threshold at an input to an optical fiber, b) a duration of the PSD overshoot with respect to a predetermined overshoot time period, c) a power level of an amplifier with respect to a gain saturation level, d) a spectral distance of a neighboring channel to a problematic channel, and/or e) an amount of cross-phase modulation between a neighboring channel and a problematic channel.

The process, according to some embodiments, may also be defined whereby the one or more problematic channels can be determined to be problematic based on a) an amount of fluctuation with respect to a predetermined range of optical power levels, b) a duration of the fluctuation with respect to a predetermined fluctuation time period, and/or c) spectral tilting of the spectrum at an output to an optical fiber. The negative impact on the spectrum health, for example, may include a) causing the spectrum to go beyond a saturation level, b) causing tilting of the spectrum, c) causing ripples in the spectrum, d) causing spectral hole burning, e) causing spectral clamping, f) causing Stimulated Raman Scattering (SRS) in the spectrum, and/or g) causing the Optical Signal-to-Noise Ratio (OSNR) of the spectrum to decrease below a minimum threshold. In response to continuously monitoring the one or more problematic channels, the process may further include the steps of a) determining when the one or more problematic channels no longer have a negative impact on the spectrum health and b) replacing the ASE channel holders with the one or more channels to enable the propagation of data traffic again.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 6 is a flow diagram illustrating a process for monitoring channels of an optical spectrum in an optical line system, according to various embodiments.

DETAILED DESCRIPTION

Figure 1:
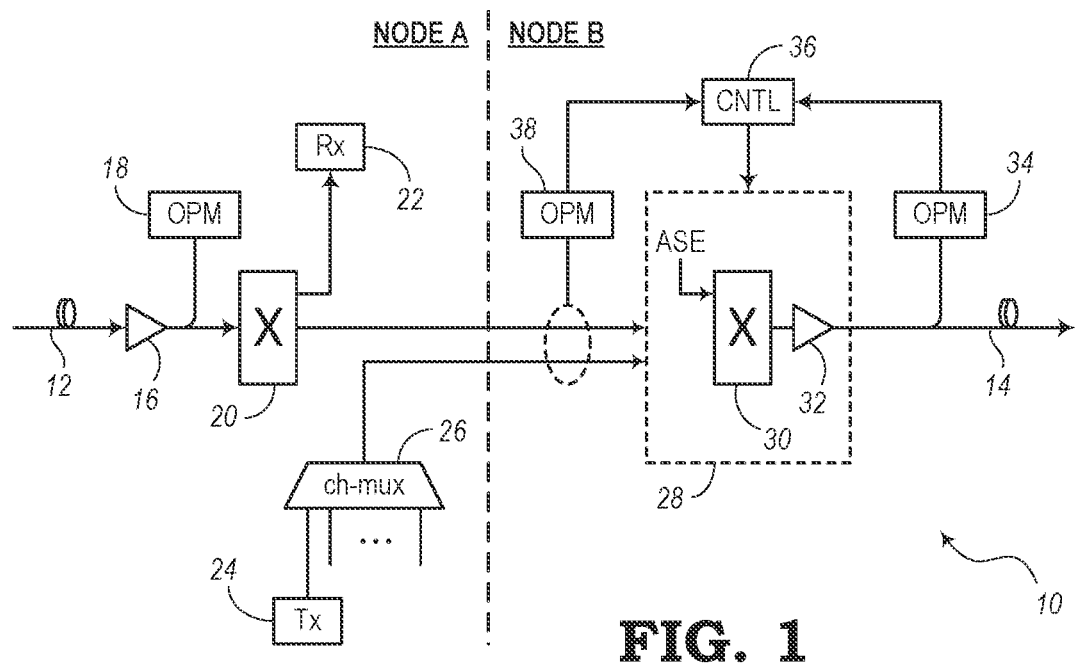
FIG. 1 is a diagram illustrating an optical line system having feedback control, according to various embodiments.

The present disclosure focuses on automatically detecting and squelching problematic or troubling traffic channels that can potentially impact "good" spectrum health in an Amplified Spontaneous Emission (ASE)-loaded subsystem. The troubling channels are identified as the ones that significantly overshoot from their target launch power to the fiber, causing a gain-saturation in amplifiers and tilting output spectrum. Also, the troubling channels may be identified as the ones that significantly fluctuate over time, creating instability among a series of control loops. It is possible to have other means to identify troubling traffic channels that can potentially impact link budget for existing neighbors with linear and non-linear impacts or can impact the turn-ups or link budget for future capacities to the network (e.g., due to tilted spectrum at the output of saturated amplifiers).

The systems and methods of the present disclosure are configured to detect troubling channels within the line system based on certain criteria such as overshoot amount, duration of overshoot, amplifier saturation condition, distance of neighbor channels from the troubling channels, etc. After detection of these troubling channels, the systems and methods automatically squelching or suppressing any troubling channels if certain conditions are not met. Then, the squelched channels are replaced with ASE or dummy channel holders. The original traffic channels can be added back to the system when their troubling conditions are cleared.

The present disclosure may include embodiments in which traffic is monitored at the first spectrum monitoring point after the traffic is introduced and then provide feedback control to replace the troubling channels with at this same point, such as the first section-mux location. The methods described herein can work generically whether the source of traffic is coming from a homogenous configuration setup (e.g., a system having shelves or control modules communicating across a channel path over a mux/demux structure) or from a disaggregated configuration setup (e.g., a system having equipment from different vendors where there is no communication among shelves or control modules across the channel path over a mux/demux structure).

Commonly assigned U.S. Pat. No. 9,853,762, entitled "Automated provisioning and control of shared optical spectrum in submarine optical networks," incorporated by reference in the present disclosure, is designed for spectrum sharing interfaces to introduce foreign traffic to Submarine Line Terminals (SLTE). The commonly assigned patent defines policies to introduce foreign traffics against spectrum width and expected power values. These may be like having Service Level Agreements (SLAs) with foreign vendors.

Spectrum monitoring devices, such as Optical Channel Monitors (OCMs), may be equipped with each Shared Spectrum Module (SSM) input and output ports to explicitly police foreign incoming signals and also to assure signal qualities before handing over to the next vendor. If any pre-agreed policies are violated, then the foreign signal is replaced with dummy channel holders.

In contrast to the commonly assigned patent, the present disclosure does not necessarily include pre-defined policies. Instead, the systems and methods of the present disclosure define the policies dynamically based on the system conditions. For example, if one or more channels (foreign or homogenous channels) overshoot their intended power level or fluctuate over a certain range, the method does not automatically trigger an ASE replacement until it is determined that the overshoot condition or fluctuation condition actually has a negative impact on the system or the spectrum health. Operating outside the acceptable realm (e.g., greater than an overshoot limit or fluctuation range) may put the channels in danger of being unrecoverable if it is determined, for example, that the total power going to the fiber span has drastically changed or the output spectrum starts tilting beyond a certain threshold. In other words, until the overshoot condition or fluctuation condition of problematic channels becomes a trouble for spectrum health or system controllers, no replacement is triggered.

As described herein, spectrum health is meant to cover anything on the spectrum, neighboring channels, other channels that are not necessarily neighboring, etc. that quantifies performance or degradation of performance of the channels on the spectrum. Negative spectrum health to some degree is a condition precedent before any problematic channels are squelched. That is, mere negative impact does not cause squelching unless it is severe enough. Some severe negative impacts on spectrum health can be an amount of fluctuation with respect to a predetermined range of optical power levels, a duration of the fluctuation with respect to a predetermined fluctuation time period, and spectral tilting of the spectrum at an output to an optical fiber. Also, the negative impact on the spectrum health can include one or more of causing the spectrum to go beyond a saturation level, causing tilting of the spectrum beyond a target or expected threshold, causing unwanted ripples in the spectrum, causing spectral hole burning, causing spectral clamping, causing Stimulated Raman Scattering (SRS) in the spectrum, causing the Optical Signal-to-Noise Ratio (OSNR) of the spectrum to decrease below a minimum threshold.

This approach allows system controllers to run SNR optimization for certain channels at the sacrifice of SNR margin for other channels present in the section (i.e., for liquid spectrum applications), where certain number of channels requiring extra margin can overshoot beyond their targets, as long as the amps do not saturate (i.e., other channels will be lowered in power to accommodate that). The present disclosure may be generic and nodal and may be generically applicable for any Reconfigurable Optical Add/Drop Multiplexer (ROADM) configurations (both terrestrial and submarine configurations). The systems and methods of the present disclosure do not require expensive SSM or OPMs at their incoming ports. It can use the first available spectrum monitoring device, which could be the mux output OPM. In either way, the methods are generic to detect troubling channels irrespective of their origin, replace them with ASE, and re-add them when their troubling conditions clear.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Optical Line System

FIG. 1 is a diagram illustrating an embodiment of an optical line system 10 of an optical network. A fiber link 12 provides input optical signals to multiple optical components of Node A (shown on the left side of the figure) and another fiber link 14 provides output optical signals from multiple optical components of Node B (shown on the right side of the figure). The first output to the fiber link 14 includes the components of Node B for providing feedback control for controlling the channels of an optical spectrum as well as controlling amplification.

As shown in FIG. 1, the optical line system 10 includes an ingress amplifier 16 that receives the optical signals along the fiber link 12. The amplified signals from the ingress amplifier 16 are provided to an Optical Performance Monitoring (OPM) device 18, which may be configured to monitor each channel of the optical spectrum. In some embodiments, the optical spectrum may include optical wavelengths in the range of 1530-1565 nm (i.e., C-band), in the range of 1565-1625 nm (i.e., L-band), or the C+L-band. The optical spectrum is divided into a plurality of channels through which communication signals can be emitted.

Also, the output from the ingress amplifier 16 is provided to a section demultiplexer (sec-demux) 20 for demultiplexing the spectrum into multiple channels. One or more channels, for example, may be removed and provided to one or more receivers (Rx) 22, while other channels may be passed along to Node B. In addition, Node A may include one or more transmitters (Tx) 24 configured to add channels through a channel multiplexer (ch-mux) 26. The multiplexed channel may also be provided to Node B.

Node B, in this embodiment, includes a spectrum handling component 28. The spectrum handling component 28 includes a section multiplexer (sec-mux) 30 and an egress amplifier 32, where the egress amplifier 32 is configured to transmit multiplexed and amplified signals along the fiber link 14 to additional equipment (not shown) in the optical network. The output signals are also monitored by an OPM device 34. According to the embodiments of the present disclosure, the OPM device 34 further provides spectrum measurement information to a control (CNTL) device 36. Based on the characteristics of the monitored channels, as described in the present disclosure, the control device 36 is configured to provide feedback control instructions back to the spectrum handling component 28. For example, the control device 36 may be configured to auto-squelch channels that overshoot a predetermined threshold for a predetermined length of time and/or those channels that fluctuate by a predetermined amount for a predetermined length of time. Thus, a channel is considered for auto-squelch due to measured overshooting and/or fluctuation characteristics. In particular, when the incoming channel power to the section-mux 30 is measured locally at the OPM device 34 and considered by the control device 36 to be higher than expected, then local compensation actions can be enacted on the spectrum handling component 28, such as by automatically squelching the troublesome or problematic channels.

In addition to auto-squelching the problematic channels, the control device 36 is configured to enable the sec-mux 30 to replace the squelched or suppressed channels with Amplified Spontaneous Emission (ASE), which may be configured as having a randomized or predetermined waveform and may be configured as a channel holder. Essentially, the ASE or channel holders may be used to maintain a consistent power level as the replaced channels to avoid issues that may be caused by changes in power. For example, the power levels as described in the present disclosure may be defined as the Power Spectral Density (PSD) of the channels or waveforms.

As described herein, maintaining proper power (e.g., PSD) levels in the waveform (or spectrum) avoids issues that may arise in the optical line system 10. For example, if the egress amplifier 32 is operating in "gain mode" (i.e., maintaining a target gain between average input and output levels), then saturating the egress amplifier 32 with higher input power may normally start tilting the output spectrum along the fiber link 14. In the present disclosure, this spectral tilt can be detected by the OPM device 34 and used by the control device 36 to compensate for this non-linearity. If the egress amplifier 32 is operating in "gain-clamp mode" (i.e., where an amplifier gain control loop, such as one including the OPM device 34 and control device 36, reduces effective Design Flat Gain (DFG) to maintain a flat output), then the output spectrum may normally start tilting when the egress amplifier 32 reaches a minimum effective gain for a given gain-range. Hence, comparing the measured spectral tilt with a target spectral tilt may provide a better indication of an amplifier saturation point, which in turn can be an accurate indicator for determining a potential negative effect on traffic channels, regardless of the amplifier's operational mode.

According to one configuration, the optical line system 10 can be setup in a "homogeneous" format, where there is proper communication between the sec-demux 20 and the sec-mux 30 and/or proper communication between the ch-mux 26 and the sec-mux 30. In this configuration, the incoming channel-power may be scaled from an upstream channel or spectrum power monitoring point. The control device 36 may be configured to determine which channel or channels of the spectrum are overshooting their expected target levels and then take appropriate actions accordingly.

If the configuration of the optical line system 10, for instance, is setup in a "disaggregated" format, where there is no communication between the sec-demux 20 and sec-mux 30 and/or between the ch-mux 26 and the sec-mux 30, the control device 36 is configured to measure overshoot locally at this first local monitoring point at the input point to the fiber link 14 and may then take actions accordingly.

For example, if the first local monitoring point of Node B is located at the line-out location (i.e., before launching to the fiber link 14), as shown in the embodiment of FIG. 1, then the channel powers can be backward scaled by the control device 36 by considering the gain-spectrum model of the egress amplifier 32. Also, the control device 36 may be configured to consider Insertion Loss (IL) and/or Wavelength Dependent Loss (WDL) of any spectrum switching element (e.g., Wavelength Selective Switch (WSS) or the like) in Node B. If the first local monitoring point is located at the input of the sec-mux 30, then the OPM device 34 may take a direct measurement of incoming spectrum and feed that back to the control device 36.

Recovery after ASE Replacement

After replacing problematic channels with ASE, the optical line system 10 may further be configured to continue to determine when incoming channels are within acceptable limits and no longer overshooting or fluctuating in such a way that caused the auto-squelching and replacing of the troubling channels with ASE in the first place. As described herein, after observing that the incoming channels are again operating within acceptable limits, then the ASE or channel holders can be removed and replaced with the traffic channels. For example, in the homogenous setup (i.e., communication between Node A switching components with the sec-mux 30 of Node B), then the optical line system 10 may execute a recovery process that monitors if the forward-scaled incoming channel power falls within a range (e.g., hysteresis-based range) of an expected power target. If so, then the original traffic channels can be added back by switching away from ASE to the traffic channels.

If the optical line system 10 is operating in the disaggregated setup (i.e., no communication between Node A and Node B, such as when the nodes represent equipment from different vendors), then the squelched channels may be periodically observed by another OPM device 38 at a local monitoring point at the input to the sec-mux 30 or spectrum handling component 28. In this case, the OPM device 38 may be positioned, as shown, to obtain measurement information about the channels that may be re-introduced back into the spectrum. The OPM device 38 may provide measurement information to the control device 36 to allow the control device 36 to determine if the channels are ready to be re-introduced. During each periodic observation, WSS slices related to traffic channels may be switched from ASE to a traffic switch port with higher than target attenuations in order to avoid any overshooting impact on spectrum health and output spectrum. Channel observations for recovery purposes can be done in bundles. That is, the control device 36 may be configured to switch only a portion of the total available spectrum at a time. This gradual or graceful re-introduction of previous problematic channels back into the spectrum may be performed in such a way so as to avoid Stimulated Raman Scattering (SRS), spectral tilt, ripple effects, etc. on other surviving channels.

Fluctuations

Other than overshoot characteristics, a channel or subset of channels in the spectrum can be considered for auto-squelching if the particular channel is fluctuating beyond a fluctuation threshold over a predetermined length of time. Such fluctuation is considered when a channel is overshooting and undershooting by more than an acceptable amount (e.g., greater than +1 dB and less than-1 dB) for a specified period of time. Such disturbance can be attributed to a channel or channels experiencing an incoming disturbance at the sec-mux 30 based on the first available monitor (e.g., OPM 34). If the above criteria are met, then the channel or channels may be automatically squelched and replaced with ASE.

Fluctuating channels can create problems for the power controllers (e.g., control device 36) running in the optical line system 10. These power controllers may be configured with Proportional, Integral, and Derivative (PID) control modules for governing how changes are to be made. Based on the various coefficients (i.e., $K_p$, $K_i$, and $K_d$) of the PID control modules, the power controllers may attempt to stabilize signals over various lengths of time and at various degrees of change. However, based on the operations of the power controllers, the optical line system 10 may invoke instabilities, depending on the rates of fluctuation, data-sampling rates for the controllers, how the controller's PID coefficients are designed to handle the fluctuations, etc.

For recovery, the incoming channel powers are monitored over a given period of time to ensure that a median or moving average of the incoming channel power remains steady (e.g., within less than +/−0.3 dB) before adding them back. That is, when sufficiently stabilized, the traffic channels can replace the temporarily added ASE or channel holders. If using a homogenous setup, the incoming channels can be forward scaled and monitored over a given period. If a disaggregated setup is used, channels may be observed with a higher than normal target attenuations and replaced in bundles. Then, the optical line system 10 may monitor backward scaled inputs over a given period before adding them back.

Amplifier Gain Control Loop

Figure 2:
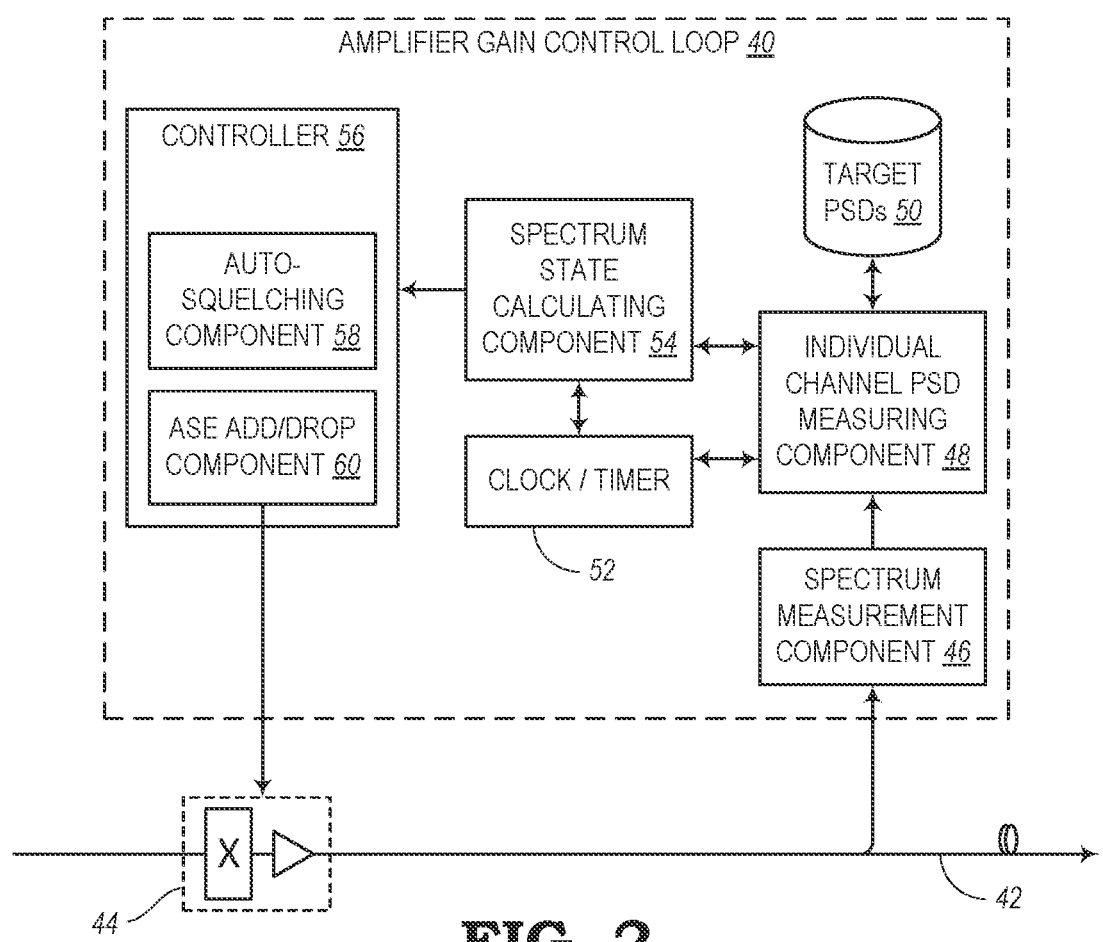
FIG. 2 is a diagram illustrating a feedback loop device for providing control functionality for controlling power levels of optical channels, according to various embodiments.

FIG. 2 is a diagram illustrating an embodiment of an amplifier gain control loop 40. The amplifier gain control loop 40 is configured to obtain optical signals from a launch point where the optical signals are intended to be transmitted along a fiber link 42. The amplifier gain control loop 40 monitors the optical signals, processes the signals, and provides feedback to a spectrum handling component 44 (e.g., spectrum handling component 28 shown in FIG. 1) for auto-squelching problematic channels and adding ASE channel holders to replace the squelched channels. Thus, the amplifier gain control loop 40 are configured to control the gain of an amplifier of the spectrum handling component 44 in a feedback loop for controlling power levels of the optical channels of a spectrum.

As illustrated, the amplifier gain control loop 40 includes a spectrum measurement component 46 configured to monitor the spectrum on the fiber link 42. The spectrum information is sent to an individual channel Power Spectral Density (PSD) measuring component 48, which is configured to measure the power level (e.g., PSD) of each channel of the spectrum. The individual channel PSD measuring component 48 may be configured to compare the PSD levels with target PSD levels stored in a database 50 or memory. Also, the individual channel PSD measuring component 48 may use a clock or timer 52 for determining when each channel measurement is made.

The channel power measurements, target PSDs, and associated times are provided to a spectrum state calculating component 54, which is configured to determine when one or more channels do not meet specific PSD targets over the course of time and designate these out-of-range channels as being problematic or troublesome. For example, if a PDS measurement of a channel is observed to be well above a target level (e.g., more than 3 dB), then the spectrum state calculating component 54 can mark that channel as problematic.

Furthermore, the amplifier gain control loop 40 includes a controller 56, which may include an auto-squelching component 58 and an ASE add/drop component 60. In response to receiving information that one or more channels do not meet the target PSD ranges, the controller 56 can auto-squelch or suppress the one or more channels using the auto-squelching component 58. Additionally, the controller 56 can add ASE filler or a channel placeholder (e.g., with random or predetermined channel waveform) in place of each of the removed channels. Also, when the amplifier gain control loop 40 determines that the problematic channels are no longer a problem and are found to be within the specific PSD target ranges, then the controller 56 can then auto-squelch the ASE and replace the ASE with the regular channel to recover the traffic through the spectrum handling component 44.

Therefore, according to various embodiments, the systems and methods of the present disclosure may be configured to detect one or more problematic (troubling) channels of an optical spectrum having multiple channels in an optical line system that is capable of adding ASE channel holders. The optical line system may be configured to communicate or transmit data-carrying channels as well as the ASE channel holders. Primarily, the problematic channels are determined to be problematic based on a potential negative impact that they may have on neighboring channels and spectrum health. For example, a channel can have a negative impact on spectrum health if experiences certain overshoot characteristics and/or fluctuation characteristics, such as when a channel has an average PSD that overshoots a target for a predetermined length of time or when it fluctuates in such a way that it exceeds an upper level and falls below a lower level repeatedly within a predetermined length of time.

Once the problematic channels are detected based on a comparison of the monitored channel characteristics and one or more predetermined target thresholds, the systems and methods of the present disclosure may be configured to determine when to start auto-squelching (or suppressing) the one or more problematic channels. The systems and methods may then locally replace the one or more squelched or suppressed problematic channels correspondingly with one or more ASE channels or dummy channel holders when the characteristics are determined to be outside the acceptable ranges or target thresholds.

Also, according to additional embodiments, the problematic channels may be identified as those that impact the link budget or performance of good neighboring channels. The impact on the spectrum health may result in linear and/or nonlinear effects that can at times result in those channels also operating outside acceptable target thresholds.

The systems and methods of the present disclosure may detect the problematic channels based on one or more of a) an amount of PSD overshoot with respect to a predetermined target launch power to the input to an optical fiber, b) a duration of the PSD overshoot with respect to a predetermined overshoot time period, c) a power level of an amplifier, d) the status of an amplifier with respect to an output gain saturation condition of the amplifier, e) a nearness of an amplifier to an amplifier saturation level, f) an allowable spectral tilt of the spectrum, g) a spectral "distance" (or closeness) of a neighboring channel to a problematic channel, whereby the spectral distance may be related to a frequency (or wavelength) difference between the problematic channels and the neighboring channels, h) a cross-phase modulation measurement of channels neighboring the one or more problematic channels, etc. Furthermore, the systems and methods may detect problematic channels based on fluctuation characteristics, such as a) an amount of fluctuation with respect to a predetermined range of optical power levels, b) a duration of the fluctuation with respect to a predetermined fluctuation time period, and c) tilting output spectrum characteristics.

In some embodiments, the amplifier gain control loop 40 may be configured to detect problematic channels as those that cause the power level to go well beyond a saturation level, those that cause spectral tilting, those that cause ripple effects in the spectrum, those that cause spectral hole burning, those that cause spectral clamping, those that cause SRS, those that cause an OSNR measurement to decrease below a minimum threshold, etc. The amplifier gain control loop 40 may be configured to monitor power levels at a point (e.g., near the input to a fiber, such as fiber link 42) and provide feedback signals in a backward-scaled manner for changing the power level of the sec-mux (e.g., spectrum handling component 44) or other switch or multiplexer, which can be based on at least the Insertion Loss (IL) and/or Wavelength Dependent Loss (WDL).

Normally, ASE might be used to replace channels in response to channels losing power based on an upstream fault, such as a fiber disconnect, optical line failure, component failure, etc. In the present disclosure, instead of attempting to reach a steady state in multiple stages, which may not be possible with disaggregated system, the systems and methods may be configured to provide feedback at a first available monitoring point downstream of the fault. ASE is normally added as needed to fill spectrum a) to keep the total power level substantially constant as the spectrum is launched onto the fiber, b) to eliminate nonlinearities in the surviving (remaining) channels in the spectrum, such as tilt, ripple, spectral hole burning, etc.

After replacing the problematic channels with ASE, the systems and methods of the present disclosure may continue to monitor the channels to determine when the channels again meet the target threshold values and no longer exceed overshoot thresholds for extended time periods and no longer fluctuate beyond acceptable tolerances. At this point, may be detected that the problematic conditions have been cleared. When it is determined that the problematic channels no longer pose a threat to spectrum health that might cause the channels to experience inconsistencies, the systems and methods of the present disclosure may then replace the added ASE channels with the regular traffic channels to recover the data traffic through the optical line system.

Since the systems and methods may be applicable to a single monitoring point in an optical line system (e.g., at an ingress point to a fiber coil), the embodiments may be used without communication with upstream or downstream components. Therefore, the embodiments may be applicable in both homogenous or disaggregated systems, where disaggregated system may refer to systems that use foreign vendor equipment. The configurations described herein may be applied to monitoring points at a degree of a node in an optical network. The embodiments may include or may be incorporated in a Reconfigurable Optical Add/Drop Multiplexer (ROADM), node, Network Element (NE), switch, router, etc. in a network. Also, the embodiments may be applicable to any suitable frequency range of optical signals, such as, for example, C-band, L-band, C+L-band, etc.

Examples of PSD and Time Thresholds

Figure 3A:
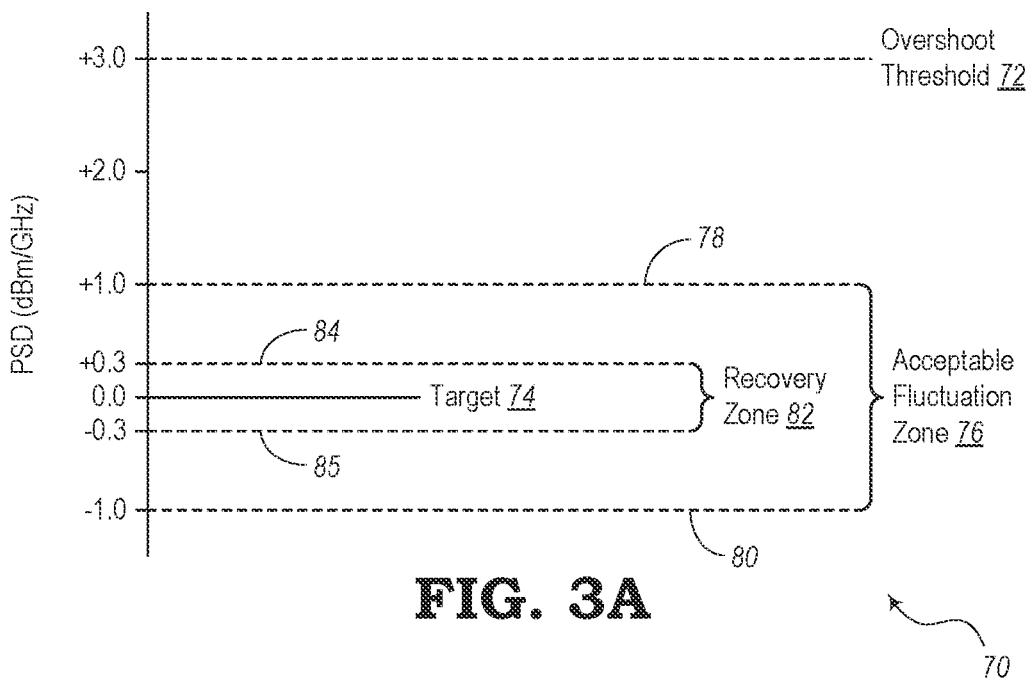
FIG. 3A is a graph showing ranges of power levels for defining various conditions of an optical line system, according to various embodiments.

FIG. 3A is a graph 70 showing an example of ranges of power levels for defining various conditions of an optical line system. It should be noted that the specific thresholds or target levels are merely examples and are not meant to be limiting. Also, it should be noted that the graph 70 may be applicable to one channel or a subset of channels, while different threshold levels may be applicable for other channels in the spectrum. In the illustrated example, the graph 70 shows an overshoot threshold 72 at 3.0 dB above a target level 74. The target level 74 may be a desired power level where a channel includes a maximum amount of power without reaching saturation or without causing spectral tilt. Thus, going above the target level 74 may result in at least a small (e.g., potentially harmless) amount of saturation. Also, going below the target level 74 may result in weaker performance and may not take advantage of more optimized power levels.

In a first detection process, the systems and methods of the present disclosure may detect whether a channel (or each individual channel) overshoots the target level 74 for a predetermined time period. For example, if the power level (e.g., PSD) of a channel exceeds the overshoot threshold 72 for the predetermined time period, then this channel is marked as being problematic and will be replaced with ASE.

According to a second detection process, the systems and methods of the present disclosure may detect whether a channel (or each individual channel) fluctuates in a problematic manner. For example, as shown in FIG. 3, the graph 70 includes an acceptable fluctuation zone 76. For detecting fluctuation nonconformity, the systems and methods may include determining if the power level repeatedly exceeds an upper fluctuation threshold 78 (e.g., 1.0 dB above the target level 74) and falls below a lower fluctuation threshold 80 (e.g., 1.0 dB below the target level 74) within a predetermined time period. Details of the detection of fluctuation are described below with respect to FIGS. 4B and 4C.

Furthermore, the graph 70 also shows a recovery zone 82 having an upper limit 84 (e.g., 0.3 dB above the target level 74) and a lower limit 85 (e.g., 0.3 dB below the target level 74). When a problematic channel is replaced with ASE, the systems and methods of the present disclosure are configured to continue monitoring the spectrum to determine when the channels are again operating within acceptable limits. Specifically, the systems and methods may determine when the channels consistently operate within the recovery zone 82 (i.e., below the upper limit 84 and above lower limit 85) for at least a predetermined time period.

Figure 3B:
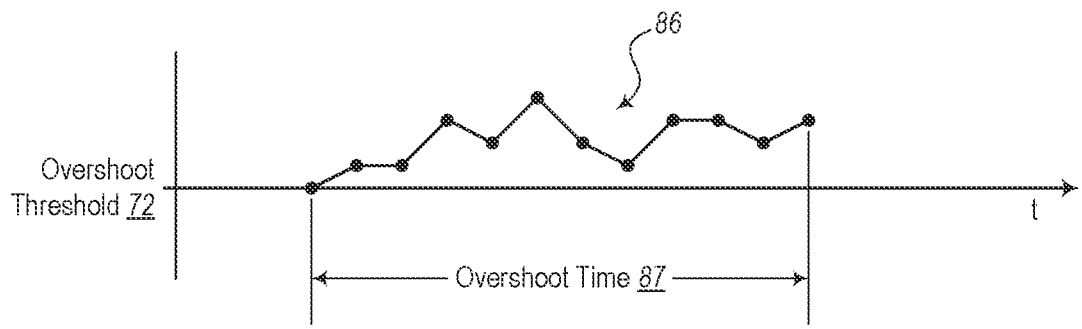
FIG. 3B is a graph showing an example of Power Spectral Density (PSD) measurements during an overshoot detection time period, according to various embodiments.

FIG. 3B is a graph 86 showing an example of a monitored channel with respect to the overshoot threshold 72. In this example, the PSD level of the channel remains above the overshoot threshold 72 for an extended length of time. As such, if it is determined that the channel PSD exceeds the overshoot threshold 72 for at least a predetermined overshoot time 87, then the channel is designated as being problematic and is replaced with ASE.

Figure 3C:
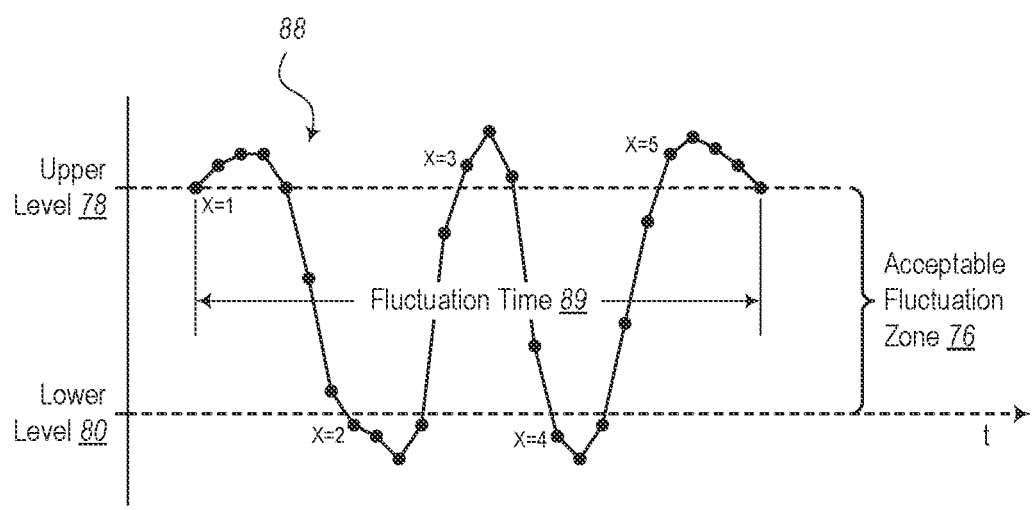
FIG. 3C is a graph showing an example of PSD measurements during a fluctuation detection time period, according to various embodiments.

FIG. 3C is a graph 88 showing an example of a monitored channel with respect to the acceptable fluctuation zone 76 having the upper level 78 and the lower level 80. In this example, the PSD level of the channel continues to fluctuate in a way where it is above the upper level 78 at some times and below the lower level 80 at other times. A fluctuation time is calculated to determine the length of time that the fluctuation continues. As such, if it is determined that the channel PSD fluctuates for at least a predetermined fluctuation time 89, then the channel is designated as being problematic and is replaced with ASE. Also, to further define what may be considered to be fluctuation, the systems and methods of the present disclosure may be configured to count the number of times that the PSD level transitions from an acceptable level (i.e., within the acceptable fluctuation zone 76) to a point outside the acceptable fluctuation zone 76 (e.g., either above the upper level 78 or below the lower level 80). As an example, the variable X may be used in this case as a counter of the number of these transitions and is incremented as shown in FIG. 3C. If it is determined that the channel PSD fluctuates such that there are at least a predetermined number of transitions from acceptable to unacceptable levels within the predetermined fluctuation time 89, then the channel experiences enough fluctuation to be considered problematic.

Method for Detecting Overshoot and/or Fluctuation Issues

Figure 4A:
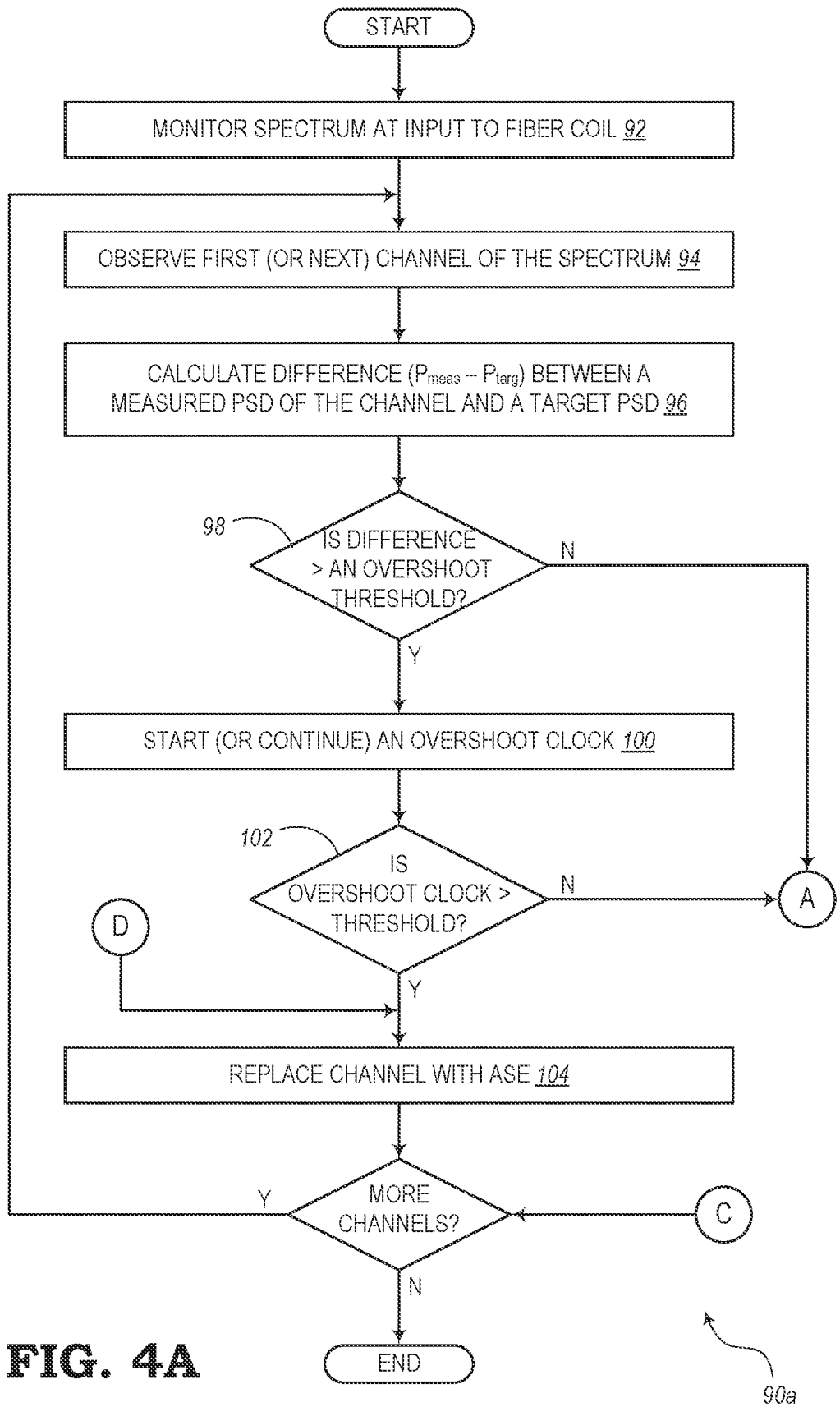
FIGS. 4A-4C together are a flow diagram illustrating a process for monitoring optical spectrum, according to various embodiments.
Figure 4B:
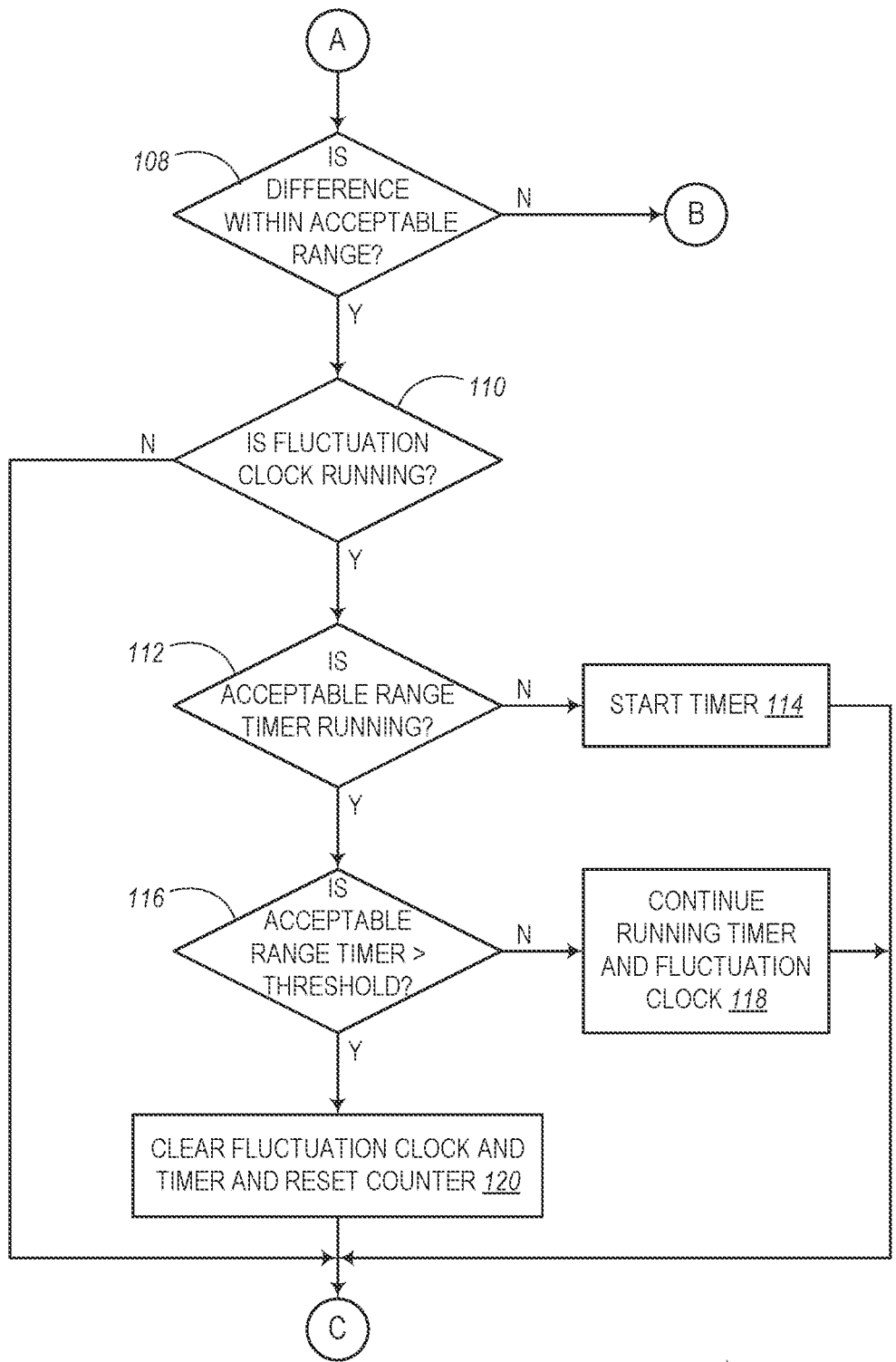
Figure 4C:
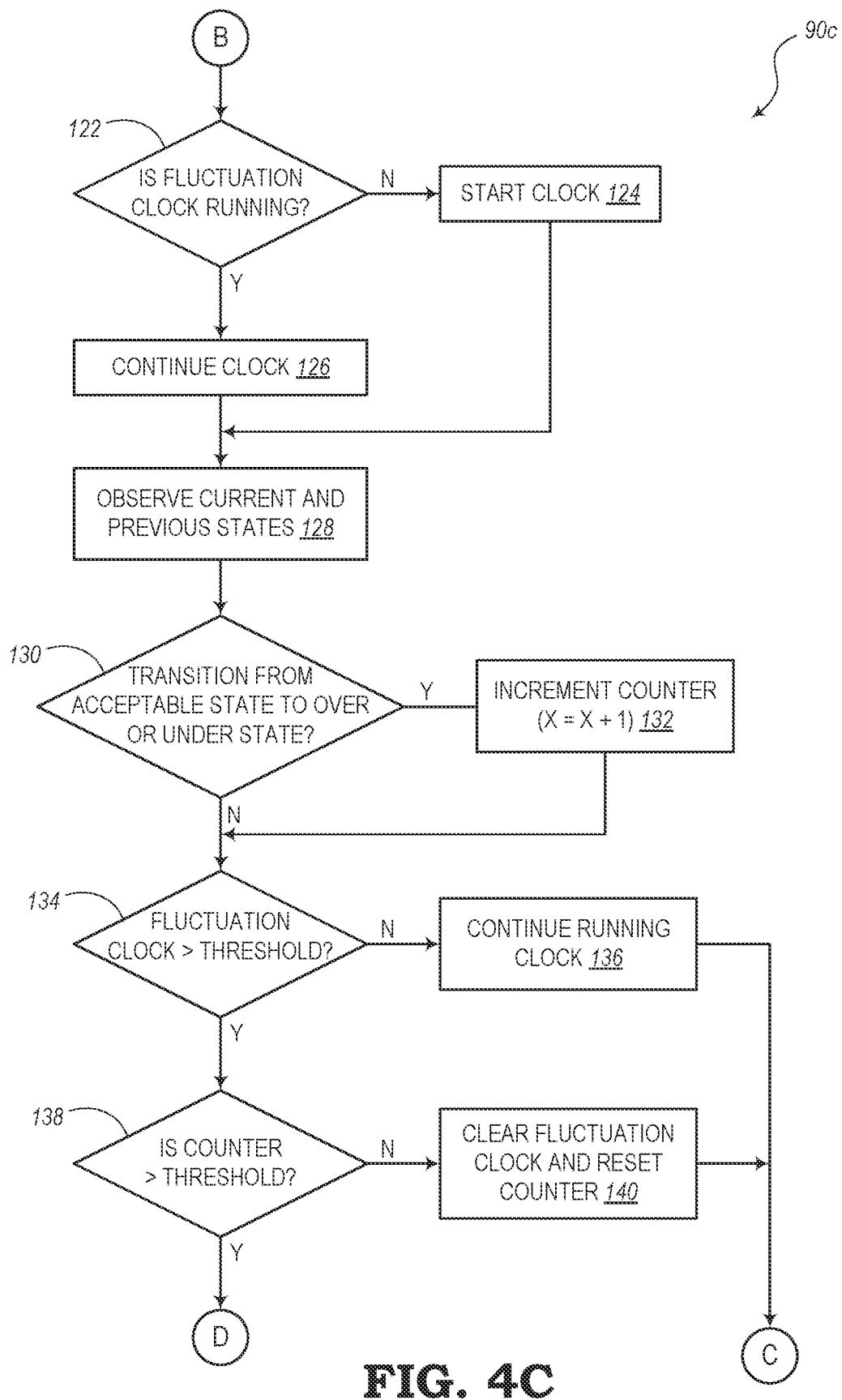

FIGS. 4A through 4C, in combination, represent a flow diagram of an embodiment of a process 90 (labelled 90a, 90b, 90c in FIGS. 4A-4C, respectively) for monitoring optical spectrum. In particular, FIG. 4A focuses on detection of a channel overshooting a threshold (e.g., overshoot threshold 72). FIGS. 4B and 4C focus on detection of a channel fluctuating outside an acceptable range (e.g., acceptable fluctuation zone 76).

As shown in FIG. 4A, the process 90 includes the step of monitoring the spectrum at the input to a fiber coil, as indicated in block 92. Next, the process 90 includes observing a first channel of the spectrum, as indicated in block 94, and thereafter observing the next channel until the entire spectrum has been processed. The process 90 further includes calculating a difference ($P_{meas}-P_{targ}$) between a measured PSD ($P_{meas}$) of the channel and a target PSD ($P_{targ}$), as indicated in block 96.

The process 90 further includes determining if the difference (calculated in block 96) is greater than an overshoot threshold (e.g., overshoot threshold 72 shown in FIGS. 3A and 3B), as indicated in condition block 98. If not, then the process goes to FIG. 4B to detect for fluctuation issues. Otherwise, if the difference is greater than the threshold, the process 90 goes to block 100, which includes the step of starting an overshoot clock, which may correspond, for example, to the start of the overshoot time 87 shown in FIG. 3B (or continuing to run the overshoot clock if it is already running).

The process 90 also include determining if the overshoot clock has been running for a predetermined time (e.g., overshoot time 87) and reaches or exceeds this time threshold, as indicated in condition block 102. If so, then the overshoot issue is detected and the process moves on to block 104, which includes the step of replacing the channel with ASE or some type of dummy channel holder. Also, the process 90 includes determining if there are more channels of the spectrum to process, as indicated in condition block 106. If so, the process 90 goes back to block 94 to observe the next channel. If, in condition block 102, it is determined that the overshoot clock does not exceed the threshold, then the process 90 goes to FIG. 4B for fluctuation detection.

As shown in FIG. 4B, after determining that overshoot is not an immediate issue, the process 90 includes the step of determining if the difference calculated in block 96 is within an acceptable fluctuation range (e.g., acceptable fluctuation zone 76). If not, then the process moves on to FIG. 4C to determine if there is a fluctuation issue. It may be noted, however, that even if the currently detected PSD is within the acceptable range, it does not necessarily mean that the PSD is not fluctuating and is currently between overshoots and undershoots. Thus, the process 90 continue on to condition block 110.

Condition block 110 includes determining if a fluctuation clock is running, which may correspond to the fluctuation time 89 shown in FIG. 3C. If the fluctuation clock is not running (and the PSD level is within the acceptable range), then it can be determined that the power of the channel is currently fine and the process 90 goes to condition block 106 to determine if more channels are to be processed. However, if the fluctuation clock is running, the process 90 goes from condition block 110 to condition block 112, which includes the step of determining if an "acceptable range timer" is running. For example, the acceptable range timer represents an amount of time that a fluctuating is actually within an acceptable range (e.g., within acceptable fluctuation zone 76). If this timer is not running, then the process goes to block 114, which includes the step of starting this timer and then returning back to condition block 106.

However, if it is determined that the acceptable range timer is already running, the process 90 goes on to condition block 116, which includes the step of determining if the acceptable range timer is longer than a predetermined threshold. If it has not been running for at least this threshold, the process 90 includes continuing to run the timer and continuing to run the fluctuation clock and then going back to condition block 106. If it is determined in condition block 116 that the threshold has been met and the power level has been in the acceptable range for an extended period of time, then it can be determined that the fluctuation is not an issue. As such, the process 90 includes clearing the fluctuation clock and acceptable range timer and resetting a counter (e.g., which is used for counting the number of times that the power level transitions from an acceptable level to an overshoot or undershoot, as describe in more detail with respect to FIG. 4C). Then, the process 90 goes back to condition block 106 to determine if more channels are to be analyzed.

As shown in FIG. 4C, the process 90 includes steps to be executed when the monitored power is outside the acceptable fluctuation range. As indicated in condition block 122, the process 90 includes the step of determining if the fluctuation clock is running. If not, the fluctuation clock is started, as indicated in block 124. If it is already running, the process 90 includes allow the clock to continue, as indicated in block 126.

Next, the process 90 includes observing a current state and a last previously observed state (e.g., immediately prior to the current state), as indicated in block 128. If it is determined that there has been a transition in states from an acceptable range to an overshoot or undershoot state, as determined in condition block 130, then the process 90 goes to block 132, which includes incrementing a transition counter (e.g., X=X+1). Otherwise, the process 90 proceeds to condition block 134.

As indicated in condition block 134, the process 90 includes determining if the fluctuation clock (e.g., length of time that the fluctuation has been going on) is greater than a predetermined threshold. If not, the process 90 continues running the fluctuation clock and looping back to condition block 106. However, if the fluctuation clock reaches the threshold, the process 90 includes determining if the counter (X) is greater than a predetermined threshold. In other words, it is determined if the power level transitions from acceptable to unacceptable a certain number of times to be considered a fluctuation that could cause problems with the spectrum health. If the counter is greater and it is determined that the fluctuation is problematic, the process 90 goes to block 104, which include replacing the channel with ASE. If there are fewer transitions, which may be considered to be an insignificant amount of fluctuation, then the process 90 goes to block 140, which includes the step of clearing the fluctuation clock and resetting the counter, thereby allowing the detection of future fluctuation events that are considered to be problematic.

According to some embodiments, a method of the present disclosure may include 1) identifying channels or a subset of spectrum, being launched on a fiber, that overshoots beyond a certain criteria or threshold. The method may also include 2) automatically replacing these channels or the subset with locally generated ASE at the first section-multiplexer (e.g., sec-mux 28, 44) in an auto-squelch and ASE-replacement procedure.

The method may also be designed to recover the channels or subset of spectrum (i.e., re-inserting the traffic channels to replace the temporary ASE) when the overshooting criteria clears. For example, a channel may be considered to be overshooting when the average PSD within the channel bandwidth is launching higher than a given target PSD or spectrum profile level.

The auto-squelch criteria may be set as a function of a) overshoot amount, b) duration of overshoot, c) distance from neighbors, d) room left before amplifier saturation, among other criteria. The overshoot amount can be considered as a threshold (e.g., 3 dB) above a channel's average PSD over a target limit. The duration may be important since there is normally little need to squelch if the overshoot event is a single transient event for a short period of time. The distance factor related to each neighbors has an inverse relationship. For example, the closer the neighbor is to the problematic channel, the more the impact of the overshoot will have on the neighbor, which is generally due to Cross-Phase Modulation (XPM). The neighbor's transmission mode or modulation format may also play a role with respect to XPM. For example, if the neighbor is 12.5 GHz away from the problematic channel, then a simple 2-3 dB overshoot may have a measurable impact on the neighbor. On the other hand, if the neighbor is 200 GHz away from the problematic channel, then an overshoot of higher than 3 dB may not have a measurable impact and may be allowed in the system. Regarding the criteria of room left before saturation, this factor may be another key decision point for the method to start auto-squelching. If the amplifier is already saturated, such that a measured spectrum tilt starts deviating from a baseline or target spectrum tilt beyond a threshold (e.g., +/−1 dB), then this factor can be used to trigger a local controller (e.g., control device 36, amplifier gain control loop 40, controller 56, etc.) to start replacing overshooting channels with ASE.

Controller

Figure 5:
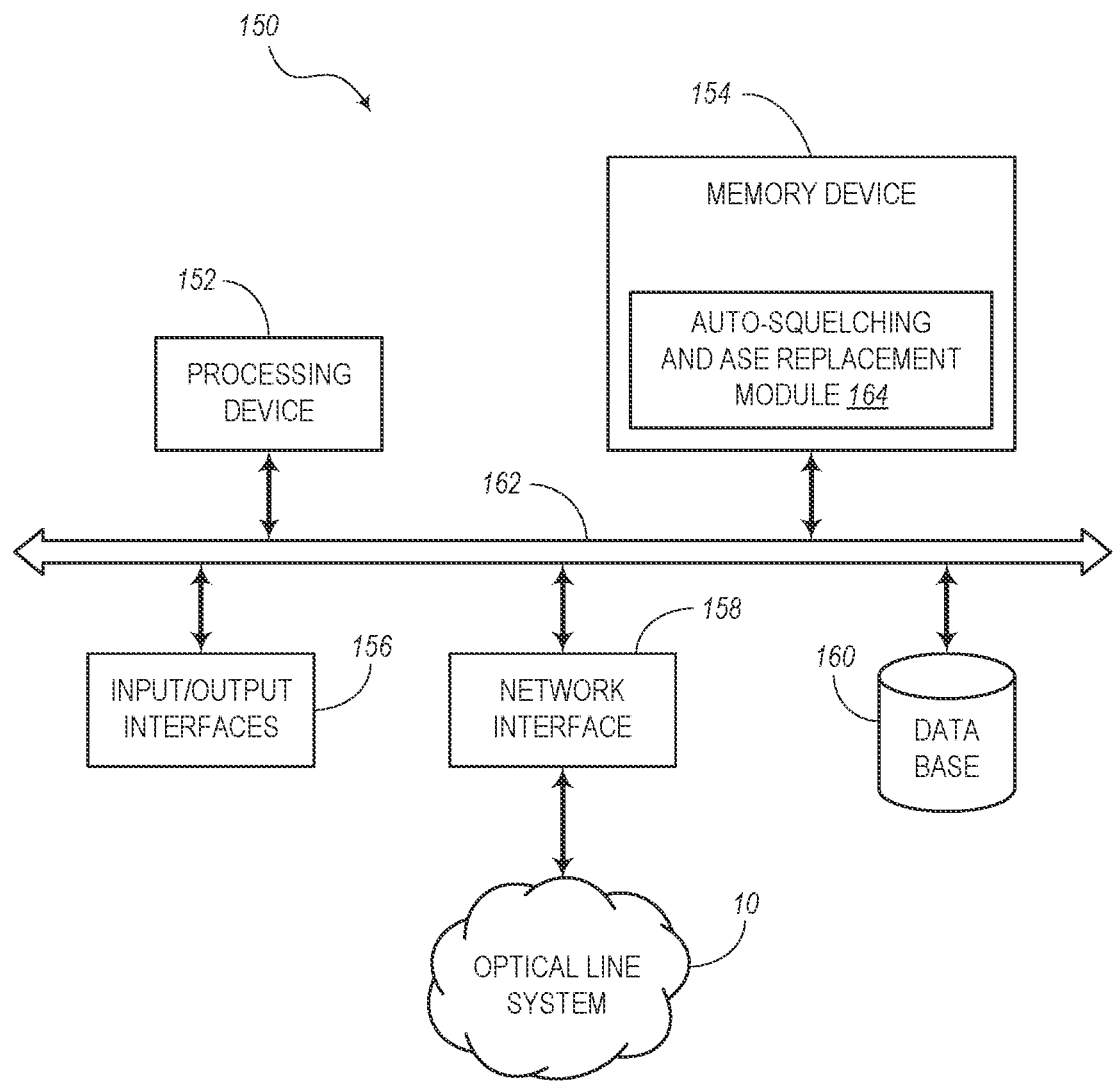
FIG. 5 is a block diagram illustrating a controller for controlling power levels of optical channels of a spectrum, according to various embodiments.

FIG. 5 is a block diagram illustrating an embodiment of a controller 150 for controlling power levels of optical channels of a spectrum propagating in an optical line system (e.g., optical line system 10). In the illustrated embodiment, the controller 150 may be a digital computing device that generally includes a processing device 152, a memory device 154, Input/Output (I/O) interfaces 156, a network interface 158, and a database 160. It should be appreciated that FIG. 5 depicts the controller 150 in a simplified manner, where some embodiments may include additional components and suitably configured processing logic to support known or conventional operating features. The components (i.e., 152, 154, 156, 158, 160) may be communicatively coupled via a local interface 162. The local interface 162 may include, for example, one or more buses or other wired or wireless connections. The local interface 162 may also include controllers, buffers, caches, drivers, repeaters, receivers, among other elements, to enable communication. Further, the local interface 162 may include address, control, and/or data connections to enable appropriate communications among the components 152, 154, 156, 158, 160.

It should be appreciated that the processing device 152, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 152 may also include or utilize stored program instructions (e.g., stored in hardware, software, and/or firmware) for control of the controller 150 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 154 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically Erasable PROM (EEPROM), hard drive, tape, Compact Disc ROM (CD-ROM), and the like), or combinations thereof. Moreover, the memory device 154 may incorporate electronic, magnetic, optical, and/or other types of storage media. The memory device 154 may have a distributed architecture, where various components are situated remotely from one another, but can be accessed by the processing device 152.

The memory device 154 may include a data store, database (e.g., database 160), or the like, for storing data. In one example, the data store may be located internal to the controller 150 and may include, for example, an internal hard drive connected to the local interface 162 in the controller 150. Additionally, in another embodiment, the data store may be located external to the controller 150 and may include, for example, an external hard drive connected to the Input/Output (I/O) interfaces 156 (e.g., SCSI or USB connection). In a further embodiment, the data store may be connected to the controller 150 through a network and may include, for example, a network attached file server.

Software stored in the memory device 154 may include one or more programs, each of which may include an ordered listing of executable instructions for implementing logical functions. The software in the memory device 154 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 152), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 152 or other suitable circuitry or logic). For example, when executed, the instructions may cause or enable the processing device 152 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 152), or any suitable combination thereof. Software/firmware modules may reside in the memory device 154, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 156 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 156 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 158 may be used to enable the controller 150 to communicate over a network, such as an optical network that includes an optical line system (e.g., optical line system 10), the Internet, a Wide Area Network (WAN), a Local Area Network (LAN), and the like. The network interface 158 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 158 may include address, control, and/or data connections to enable appropriate communications on the optical line system 10.

Furthermore, the controller 150 includes an auto-squelching and ASE replacement module 164. The auto-squelching and ASE replacement module 164 may be implemented in any suitable combination of software and/or firmware in the memory device 154 and/or hardware in the processing device 152. The auto-squelching and ASE replacement module 164 may be stored on any suitable non-transitory computer-readable media (e.g., memory device 154) and may include computer logic or software having instructions that, when executed, enable or cause the processing device 152 to perform certain functions, such as those actions described throughout the present disclosure related to auto-squelching (or auto-suppressing) problematic or troublesome channels in an optical spectrum and replacing those problematic channels with ASE or other suitable type of channel fillers or channel holders to maintain substantially consistent power levels.

General Process

FIG. 6 is a flow diagram illustrating an embodiment of a process 170 for monitoring channels of an optical spectrum in an optical line system. In response to analyzing optical signals propagating in an optical line system, the process 170 includes the step of determining whether one or more channels of a spectrum of the optical signals are problematic, as indicated in block 172. The one or more problematic channels are determined to be problematic based on the severity of a negative impact that the one or more problematic channels have on spectrum health. Furthermore, the process 170 includes the step of auto-squelching the one or more problematic channels by replacing the one or more problematic channels with one or more Amplified Spontaneous Emission (ASE) channel holders, as indicated in block 174.

In some embodiments, the one or more problematic channels may be determined to be problematic based on a) overshoot characteristics measured over a first predetermined length of time with respect to a first target level, and/or b) fluctuation characteristics measured over a second predetermined length of time with respect to second and third target levels. In addition, the one or more problematic channels may be determined to be problematic based on a) a Power Spectrum Density (PSD) of the respective channel exceeding the first target level over the first predetermined length of time, and/or b) a PSD of the respective channel falling outside a range of target PSD levels between the second and third target levels.

According to some embodiments, the one or more problematic channels may be determined to be problematic based on an impact on the link budget or performance of the spectrum health being greater than a predetermined threshold. Also, the one or more problematic channels may be determined to be problematic based on a) an amount of a Power Spectral Density (PSD) overshoot with respect to a predetermined launch power threshold at an input to an optical fiber, b) a duration of the PSD overshoot with respect to a predetermined overshoot time period, c) a power level of an amplifier with respect to a gain saturation level, d) a spectral distance of a neighboring channel to a problematic channel, and/or e) an amount of cross-phase modulation between a neighboring channel and a problematic channel.

The process 170, according to additional embodiments, may also be defined whereby the one or more problematic channels can be determined to be problematic based on a) an amount of fluctuation with respect to a predetermined range of optical power levels, b) a duration of the fluctuation with respect to a predetermined fluctuation time period, and/or c) spectral tilting of the spectrum at an output to an optical fiber. The negative impact on the spectrum health, for example, may include a) causing the spectrum to go beyond a saturation level, b) causing tilting of the spectrum, c) causing ripples in the spectrum, d) causing spectral hole burning, e) causing spectral clamping, f) causing Stimulated Raman Scattering (SRS) in the spectrum, and/or g) causing the Optical Signal-to-Noise Ratio (OSNR) of the spectrum to decrease below a minimum threshold. In response to continuously monitoring the one or more problematic channels, the process 170 may further include the steps of determining when the one or more problematic channels no longer have a negative impact on the spectrum health and replacing the ASE channel holders with the one or more channels to enable the propagation of data traffic again.

Conclusion

An optical line system (e.g., optical line system 10) may be configured to run at or near a spectrum saturation level. When one or more channels start overshooting a target level, two kinds of problems may result. Since there may not be a lot of margin before a saturation level is reached, then, when more power is added, the spectrum may begin to saturate. Although a little bit of saturation may be tolerable, when it goes well beyond the saturation, the spectrum may start to clamp or tilt. When spectrum is tilted, it can cause a problem for spectrum health, which may also experience tilt, ripple, etc., which may have a negative impact on and cause problems for not only the nearby channels but also those channels that are farther away in the spectrum. This can also create a problem when one or more new channels are to be added in the optical line system.

Typically, spectral tilt results in a situation where the shorter wavelengths (e.g., near the 1530 nm wavelength edge of the C-band) will have a higher power and the longer wavelengths (e.g., near the 1560 nm wavelength edge of the C-band) will have a lower power. Another thing is that spectral tilt is typically not a linear tilt and it include ripples, where some ripples may even be more pronounced than others. As a result of spectral tilt, certain problems may start happening, such as an increase in a noise figure of an Optical Signal-to-Noise Ratio (OSNR). If the amplifier is generating more noise, then the characteristics of the spectrum power can experience undesirable non-linearities.

It may be noted that the monitored channels may include a first set of channels that are related to network equipment that is controlled by the same vendor as the monitoring system. A second set of channels may be related to network equipment that is unrelated to this vendor and may be controlled by foreign vendors. Nevertheless, the systems and methods of the present disclosure are configured to handle the functions described herein regardless of whether the problematic channels and/or neighboring channels are controlled by the same vendor (e.g., an aggregated or homogenous system) or the problematic channels and/or neighboring channels are controlled by one or more different vendors (e.g., a disaggregated system). Also, there may be some situations where, even if there is end-to-end communication with a common vendor, some equipment may not be set up properly to enable communication with respect to PSD monitoring. As such, the monitoring and feedback control can be a local procedure such that it does not depend on communication from upstream or downstream equipment.

In some embodiments, some channels may be impacted by other problematic channels and may be detected as being problematic themselves. In this case, some of the processes discussed herein can be adjusted accordingly to replace only the most problematic channels with ASE first before moving on to the less severely offending channels. In this way, removing the biggest offending channels, the PSD levels may stabilize without the need to remove the less offending channels. Then, after running with the most problematic channels squelched, further analysis may determine whether or not additional channels need to be removed as well.

It also may be noted that an optical line system may not necessarily include a power controller at every monitoring point. In this case, the channels can be attenuated at an input as needed. However, even if this is the case, there is a limit to how well such attenuation can be beneficial in the optical line system. For example, if a customer is powering the spectrum at a level that is clearly above saturation (e.g., 10 dB power above a target level), the power controller may attenuate by up to 10 dB. However, when some sort of power reduction is removed (e.g., releasing a fiber pinch), there may be a limit to how much can be compensated. When the compensation or problem goes away, then the spectrum may encounter a large dip in power.

Instead of a power controller, an optical line system may include a dampened type of response, as opposed to an attenuator. However, this may take time to take stabilize and may not be able to be completely corrected in a short portion of the optical line system (e.g., at the monitoring point). A fast response may be possible to bring down the overshoot, but there is a limit to how much can be brought down at once. Again, this too may depend on the PID coefficients of a control device, location of the neighboring channels with respect to the problematic channels, a control mode, and other criteria Detecting the overshooting channels may further include dynamically optimizing performance for some channels while taking out the link budget or power for some channels. The process may include adjusting neighboring channels as needed to account for the impact of problematic channels. Again, these processes can be implemented simultaneously while trying to optimize the system. From that perspective, some channels might be overshooting for a certain period of time, while others may be undershooting for a certain period of time. However, as long as they are maintained with acceptable ranges and not violating the system's health (e.g., not saturating the system, not tilting the spectrum, not creating problems for the spectrum health, etc.), then the channels may be acceptable and do not necessarily need to be replaced. Thus, according to some situations, minor changes in amplifier gain can be made for each individual channel, without the need to squelch slightly problematic channels.

Thus, the present disclosure provides many embodiments that have certain points of novelty with respect to conventional systems. For example, the systems and methods of the present disclosure may detect troublesome neighboring traffic channels that could impact the link budget or performance of the nearby "good" channels. By detecting their overshoot amounts, overshoot duration, distance from these neighbors, amplifier total power, output saturation, spectrum tilt conditions, etc., the systems and methods can determine when it may be time to squelch these troublesome channels and replace them with ASE. Also, the procedure of monitoring fluctuation characteristics of the spectrum health may be used for determining when it is time for troublesome channels to be replaced. Another point of novelty may include the detection of overshoot characteristics and fluctuation characteristics over a predetermined period of time, to thereby prevent overreaction to a transient event that may be corrected without intervention. That is, troubling channels can be detected dynamically based on system conditions and not necessarily pre-defined policies.

Furthermore, novelty may also be found with respect to the process of automatically squelching troubling neighbors and replacing them with ASE and/or dummy channel holders and then allowing the troubling neighbors to be re-added when their "troubling" criteria clears. Also, the present disclosure provides a simplified approach by monitoring "incoming" channel powers on a first spectrum monitoring point, which can work generically both for homogenous and disaggregated (foreign) systems, nodes, degrees, etc. for foreign transponder connections.

Submarine

One use case of the present disclosure includes use in a submarine system namely in an "Open Cable" model. In this model, open submarine cables are cables that allow the purchaser, wholesaler or Internet Content Provider (ICP), the freedom to choose the submarine line terminating equipment (SLTE), including coherent optical modems, separately from the submerged wet plant. The advent of uncompensated submarine cables and the industry acceptance of the Open Cable model has made spectrum sharing a viable method to partition a submarine cable fiber pair. Early agreements limited the focused to the technical aspects of the spectrum manager to correctly segment spectrum between users. As agreements have become more sophisticated a broader set of operational and commercial considerations are being incorporated in contractual commitments. The present disclosure can be used in different spectrum sharing paradigms and the associated contractual requirements. Spectral assignment, policing parameters, equalization methods, launch profiles and restoration triggers are among items for discussion during the commercial agreement creation. The present disclosure can include processes to ensure spectrum sharing operations satisfy all parties based on experiences from multiple current implementations. Processes include considerations of spectrum manager operation, the notification between parties for the network operations, notification methodology and what actions are automatic versus manual.

Operational, Cost, and Capacity Optimization Strategies for Subsea Networks

Significant advancements in real-time subsea coherent modem technology have been made to address a wide array of networks and configurations. Discrete and analog tunability in a modem's client rate, baud, and propagation characteristics can supply network operators with multiple transmission solutions for a given digital line section (DLS), where each solution can have implications on operational simplicity, cost per bit, and spectral efficiency (or capacity). These transmission solutions are modem and network specific, requiring holistic optimization techniques that account for routing planes, DLS design, photonic topology, reliability/availability, and performance pre-requisites.

It is possible to explore channel deployment scenarios for Point-of-Presence (PoP) to Cable Landing Site (CLS) networks using generally available hardware. The hardware includes Reconfigurable Optical Add/Drop Multiplexer (ROADM) terminals and coherent optical modems with discrete selections in bauds and line rates. The networks are deployed on a flexible grid at a sub-optimal uniform channel configuration, with real-time Signal-to-Noise Ratio (SNR) performance metrics (PMs) reported to the operator. A selection of algorithms can use the reported PMs in an optimization routine. The individual transmission modes for each channel is then selected based on three criteria; operational simplicity, defining the ease in matching clients from the backhaul network to the subsea segment; cost per bit, identifying the most economical distribution of hardware; and spectral efficiency, for maximizing capacity per fiber pair. It is shown that certain algorithms can deploy unique channel groupings that can frequently satisfy only one of the optimization criteria. Hence, it is possible to explore expanded feature sets within SLTE technology that can jointly satisfy all three optimization criteria.

CONCLUSION

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method, implemented in an optical line system, comprising steps of:
monitoring traffic channels of a plurality of traffic channels;
determining one or more traffic channels of the plurality of traffic channels are problematic with respect to other traffic channels of the plurality of traffic channels, wherein the plurality of traffic channels are problematic based on one or more characteristics continuously or repeatedly exceeding predetermined thresholds over a predetermined length of time indicative of a persistent or recurrent condition; and
squelching the one or more traffic channels and replacing the squelched one or more traffic channels with channel holders.

2. The method of claim 1, wherein the steps further include
continuing the monitoring of the squelched one or more traffic channels;
determining the squelched one or more traffic channels are no longer problematic; and
re-adding the squelched one or more traffic channels by replacing the channel holders therewith.

3. The method of claim 1, wherein the one or more traffic channels are problematic based on their impact on the other traffic channels as defined by certain criteria.

4. The method of claim 3, wherein the certain criteria is evaluated using a predetermined range over a predetermined fluctuation time period.

5. The method of claim 1, wherein the one or more traffic channels are problematic based on overshoot characteristics measured over a first predetermined length of time with respect to a first target level.

6. The method of claim 1, wherein the one or more traffic channels are problematic based on fluctuation characteristics measured over a second predetermined length of time with respect to second and third target levels.

7. The method of claim 1, wherein the one or more traffic channels are problematic based on a Power Spectrum Density (PSD) of a respective channel exceeding a target level over the predetermined length of time.

8. The method of claim 1, wherein the one or more traffic channels are problematic based on a Power Spectrum Density (PSD) of a respective channel falling outside a range of target PSD levels.

9. The method of claim 1, wherein the one or more traffic channels are problematic based on negative impact on health of spectrum which causes any of tilting of the spectrum, causing ripples in the spectrum, causing spectral hole burning, causing spectral clamping, causing Stimulated Raman Scattering (SRS) in the spectrum, and causing Optical Signal-to-Noise Ratio (OSNR) of the spectrum to decrease below a minimum threshold.

10. A system comprising:
a spectrum handling component;
one or more Optical Performance Monitoring (OPM) devices connected to any of inputs or outputs of the spectrum handling component and configured to monitor traffic channels of a plurality of traffic channels which are being added to the spectrum handling component; and
a control device comprising circuitry configured to
determine one or more traffic channels of the plurality of traffic channels are problematic with respect to other traffic channels of the plurality of traffic channels, wherein the plurality of traffic channels are problematic based on one or more characteristics continuously or repeatedly exceeding predetermined thresholds over a predetermined length of time indicative of a persistent or recurrent condition, and
cause squelching the one or more traffic channels and cause replacing the squelched one or more traffic channels with channel holders.

11. The system of claim 10, wherein the one or more OPM devices are further configured to continue the monitoring of the squelched one or more traffic channels, and
wherein the control device is further configured to
determine the squelched one or more traffic channels are no longer problematic, and
cause re-adding the squelched one or more traffic channels by causing replacing the channel holders therewith.

12. The system of claim 10, wherein the one or more traffic channels are problematic based on their impact on the other traffic channels as defined by certain criteria.

13. The system of claim 12, wherein the certain criteria is evaluated using a predetermined range over a predetermined fluctuation time period.

14. The system of claim 10, wherein the one or more traffic channels are problematic based on overshoot characteristics measured over a first predetermined length of time with respect to a first target level.

15. The system of claim 10, wherein the one or more traffic channels are problematic based on fluctuation characteristics measured over a second predetermined length of time with respect to second and third target levels.

16. The system of claim 10, wherein the one or more traffic channels are problematic based on a Power Spectrum Density (PSD) of a respective channel exceeding a target level over the predetermined length of time.

17. The system of claim 10, wherein the one or more traffic channels are problematic based on a Power Spectrum Density (PSD) of a respective channel falling outside a range of target PSD levels.

18. The system of claim 10, wherein the one or more traffic channels are problematic based on negative impact on health of spectrum which causes any of tilting of the spectrum, causing ripples in the spectrum, causing spectral hole burning, causing spectral clamping, causing Stimulated Raman Scattering (SRS) in the spectrum, and causing Optical Signal-to-Noise Ratio (OSNR) of the spectrum to decrease below a minimum threshold.

19. A non-transitory computer readable medium comprising instructions that, when executed, cause one or more processors to implement steps of:
responsive to monitoring traffic channels of a plurality of traffic channels in an optical line system, determining one or more traffic channels of the plurality of traffic channels are problematic with respect to other traffic channels of the plurality of traffic channels, wherein the plurality of traffic channels are problematic based on one or more characteristics continuously or repeatedly exceeding predetermined thresholds over a predetermined length of time indicative of a persistent or recurrent condition; and
squelching the one or more traffic channels and replacing the squelched one or more traffic channels with channel holders.

20. The non-transitory computer readable medium of claim 19, wherein the steps further include
continuing the monitoring of the squelched one or more traffic channels;
determining the squelched one or more traffic channels are no longer problematic; and
re-adding the squelched one or more traffic channels by replacing the channel holders therewith.

* * * * *